US007562086B2

(12) United States Patent
Mirchandani et al.

(10) Patent No.: US 7,562,086 B2
(45) Date of Patent: Jul. 14, 2009

(54) CUSTOM GROUPING FOR DIMENSION MEMBERS

(75) Inventors: Akshai M. Mirchandani, Redmond, WA (US); Alexander Berger, Sammamish, WA (US); Thomas P. Conlon, Redmond, WA (US); Edward Melomed, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 361 days.

(21) Appl. No.: 11/167,413

(22) Filed: Jun. 27, 2005

(65) Prior Publication Data

US 2006/0010159 A1 Jan. 12, 2006

Related U.S. Application Data

(60) Provisional application No. 60/586,501, filed on Jul. 9, 2004.

(51) Int. Cl.
*G06F 7/00* (2006.01)

(52) U.S. Cl. .................................................. 707/101

(58) Field of Classification Search ...................... None
See application file for complete search history.

(56) References Cited

U.S. PATENT DOCUMENTS 5,918,232 A 6/1999 Pouschine et al.
5,940,818 A 8/1999 Malloy et al.
5,978,788 A 11/1999 Castelli et al.
6,189,004 B1 2/2001 Rassen et al.
6,205,447 B1 3/2001 Malloy
6,223,171 B1 4/2001 Chaudhuri et al.
6,317,750 B1 11/2001 Tortolani et al.
6,434,544 B1 * 8/2002 Bakalash et al. .............. 707/10
6,651,055 B1 11/2003 Kilmer et al.
6,721,760 B1 4/2004 Ono et al.
6,775,675 B1 * 8/2004 Nwabueze et al. .......... 707/100
6,877,006 B1 * 4/2005 Vasudevan .................. 707/10
6,901,406 B2 * 5/2005 Nabe et al. .................. 707/102
2002/0087633 A1 * 7/2002 Nelson ....................... 709/204
2002/0087686 A1 * 7/2002 Cronk ........................ 709/225
2004/0059724 A1 3/2004 Petculescu et al.
2004/0225692 A1 11/2004 Pasumansky et al.

* cited by examiner

*Primary Examiner*—Charles Rones
*Assistant Examiner*—Dinku W Gebresenbet
(74) *Attorney, Agent, or Firm*—Workman Nydegger

(57) ABSTRACT

Custom grouping for dimension members of an On-Line Analytical Processing (OLAP) cube is facilitated by an interface component that receives a grouping from a user. A modification component alters an attribute of a session OLAP data cube or a virtual OLAP multi-dimensional data cube so that the change becomes readily available without the time-consuming delay associated with rebuilding or reprocessing the underlying structure. A data scheme generation component produces a data definition language (DDL) definition of a user defined attribute executed by an execution component to affect the change to a data cube. Custom groupings can provide an intermediate dimension level for drill down and/or drill up or roll-up between a level with few members and a level with numerous members. A separate dimensional attribute or level can be created and a group defined comprising or mapping a set or collection of discrete members.

26 Claims, 14 Drawing Sheets

CUSTOM GROUPING FOR DIMENSION MEMBERS

CROSS-REFERENCE TO RELATED APPLICATIONS

This application claims the benefit of U.S. Provisional Application No. 60/586,501, filed Jul. 9, 2004 and entitled SYSTEMS AND METHODS THAT FACILITATE USAGE OF DATABASES. The entirety of this application is incorporated herein by reference.

BACKGROUND

Data warehousing and online analytical processing (OLAP) are widespread technologies employed to support business decisions and data analysis. A data warehouse is a nonvolatile repository for an enormous volume of organizational or enterprise information (e.g., 100 MB-TB). These data warehouses are populated at regular intervals with data from one or more heterogeneous data sources, for example from multiple transactional systems. This aggregation of data provides a consolidated view of an organization from which valuable information can be derived. Though the sheer volume can be overwhelming, the organization of data can help ensure timely retrieval of useful information.

Data warehouse data is often stored in accordance with a multidimensional database model or cube. A cube has two major modeling components, namely measure groups or measures and dimensions. Measures represent real values or factual data that can be analyzed. For instance, measures can correspond to sales or the number of units sold. Dimensions represent qualitative information about data, such as time or product. Stated differently, a dimension describes an entity by which a user wants to analyze their data. A dimension is a collection of attributes that source the dimension's hierarchies and member properties. For example, a time dimension can include distinct attributes including a set of members such as year, month and day, which can be employed to define a dimension hierarchy. Accordingly, data can be viewed or navigated at different levels of detail.

There are at least two primary reasons for the existence of multidimensional databases. First, the multidimensional model is optimized to deal with large amounts of data. In other words, it has a fast query response over large data volumes. Furthermore, the multidimensional model is business user friendly. This enables users execute complex queries on a data cube and retrieve valuable information. Today, OLAP is almost synonymous with multidimensional databases.

OLAP is a key element in a data warehouse system. OLAP describes a category of technologies or tools utilized to retrieve data from a data warehouse. These tools can extract and present multidimensional data from different points of view to assist and support managers and other individuals examining and analyzing data. The multidimensional data model is advantageous with respect to OLAP as it allows users to easily formulate complex queries, and filter or slice data into meaningful subsets, among other things. There are two basic types of OLAP architectures MOLAP and ROLAP. MOLAP (Multidimensional OLAP) utilizes a true multidimensional database to store data. ROLAP (Relational OLAP) utilizes a relational database to store data but is mapped so that an OLAP tool sees the data as multidimensional. HOLAP (Hybrid OLAP) is an amalgam of both MOLAP and ROLAP.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the provided subject matter concerns efficient modification of multidimensional database cubes without the time-consuming delay associated with rebuilding or reprocessing of underlying structure. In a ROLAP model, for instance, any cube alteration can require modification of foundational relational source tables and subsequently rebuilding the cube on top of such tables. Systems and methods are presented herein, among other things, to facilitate modification of the representation of a cube dimension on the fly or substantially in real-time.

In accordance with one exemplary disclosed implementation, data cube modification can be provided to support user-defined custom grouping of dimensions members. The custom grouping can furnish an intermediate dimension level for drill down and/or drill up or roll-up between a level with few members and a level with numerous members. Additionally or alternatively, the grouping can correspond to a top-level attribute grouping. Hence, one or more new dimension attributes or levels may need to be added to a data cube to support querying and/or viewing of data in accordance with the defined groupings.

A system to support on the fly cube modification is disclosed herein. The system can include an interface component that obtains information, such as grouping information, specified at least in part by a user. The information from the interface component can be communicated to a modification component. The modification component can alter a data cube representation or create a new cube for use based on the information provided. For instance if grouping information is provided identifying a new dimensional attribute comprising a one or more custom groupings, then the modification component can add a new dimension attribute or level to a cube to facilitate querying or viewing data with respect to the new attribute.

Various methods are also provided relating to multidimensional data cubes. For example, a method of modeling dimensional data is disclosed that comprises creating a custom grouping attribute discretized by a user and adding the attribute to a multidimensional data model dimension.

To the accomplishment of the foregoing and related ends, certain illustrative aspects of the invention are described herein in connection with the following description and the annexed drawings. These aspects are indicative of various ways in which the invention may be practiced, all of which are intended to be within the scope of invention. Other advantages and novel features may become apparent from the following detailed description when considered in conjunction with the drawings.

DETAILED DESCRIPTION

Figure 1:
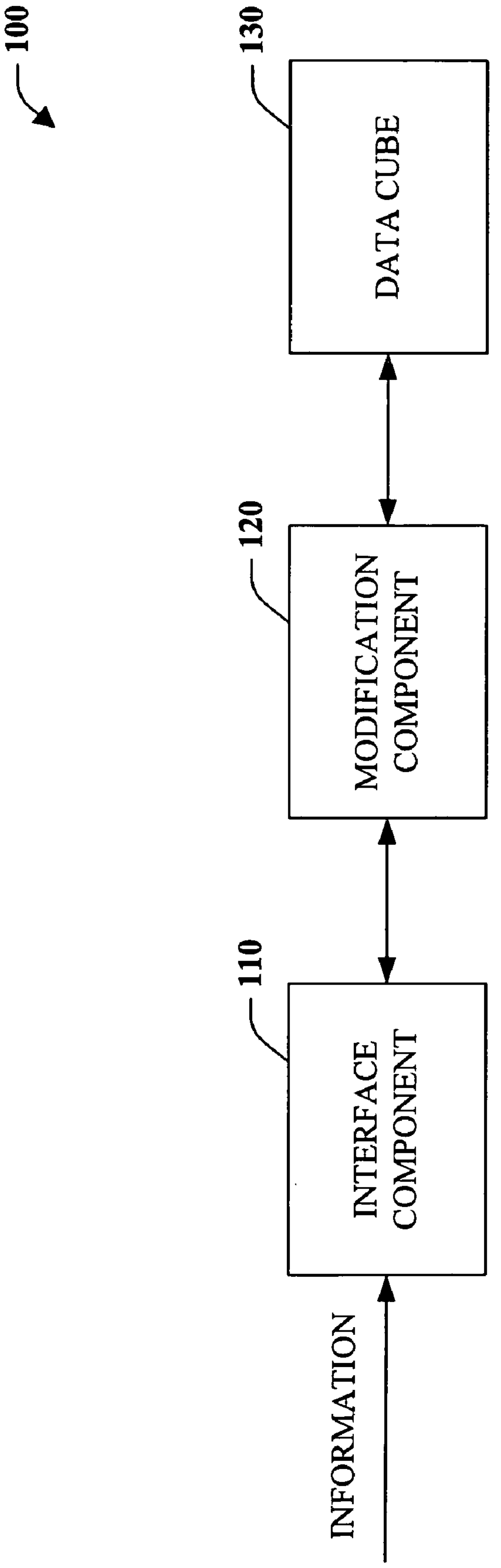
FIG. 1 is a block diagram of a data-structure modification system.

The various aspects of the subject invention are now described with reference to the annexed drawings, wherein like numerals refer to like or corresponding elements throughout. It should be understood, however, that the drawings and detailed description relating thereto are not intended to limit the invention to the particular form disclosed. Rather, the intention is to cover all modifications, equivalents, and alternatives falling within the spirit and scope of the claimed subject matter.

As used herein, the terms "component," "system," "engine" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

OLAP systems can be built by defining a multidimensional model or cube based on a view of data to be analyzed, generating structures in accordance with the model and populating the structures with data. For example, with respect to a ROLAP system, relational tables are defined and dimension attributes are mapped to columns and/or rows. Dimension hierarchies can subsequently be built utilizing the dimension attributes and finally the dimensions are loaded with data. An alteration to the model or cube structure necessitates time-consuming reprocessing or rebuilding of the cube. For example, a relational database table will be altered to reflect an addition of a new dimension. Subsequently, the entire cube is rebuilt and reloaded with data. Such a process could take hours or days to complete depending on the amount of data involved.

Turning initially to FIG. 1, a data structure interaction system 100 is provided. System 100 enables a data structure such as a multidimensional cube to be modified without having to rebuild or reprocess the structure. The system 100 includes interface component 110, modification component 120 and data cube 130. Interface component 110 can receive cube modification information including but not limited to custom grouping information. Custom grouping information pertains to user-defined groups. Such information can include a collection of groups including one or more members or dimensional members. For example, a custom grouping could be a product grouping that includes product 1, product 2, and product 3. Furthermore, a grouping could be hierarchical such as a product category 1 including a product group 1 and a product group 2, where product group 1 includes product 1 and product 2 and product group 2 includes product 3, product 4 and product 5. In other words, the group is user defined and discretized. Such information could be provided by a user if they wish to include an additional dimension attribute or level that was not defined as part of the original data model. For example, a user may have a location dimension that includes a country attribute and a state attribute. However, the user may wish to view the data by region such as east coast, west coast, Midwest, and the like. Accordingly, they could define a new attribute including a grouping of a plurality of states by region. Interface component 110 facilitate gathering of such information and can include but is not limited to a spreadsheet application, a pivot table service, data structure viewing application and a wizard.

Modification component 120 receives the information regarding alteration of a structure such as via addition of a new attribute grouping to a cube. Upon receipt, grouping component 120 modifies or alters the data cube 130 in accordance with the received information. Data cube 130 can be but is not limited to a session and/or virtual multidimensional database cube. Once the cube structure has been modified, the cube can be utilized. There is no need to rebuild or reprocess data and delay utilization until such operations are completed. Where a custom grouping attribute is added to a dimension hierarchy, information on the dimension did not actually change. Rather, additional information was added to define the new grouping and mapping to existing dimensions without alteration of the structure itself. In this manner, a structure can be updated by simply adding an attribute that maps to one or more member collections. It should also be appreciated that attributes can be deleted. For example, a newly added attribute can subsequently be removed from a cube definition. Furthermore, the custom grouping could be modified to include different members for example to support 'what if' analysis of the data. For instance, a custom regional grouping attribute could be altered to include or remove a state from a particular region to identify the effect of such a move on the group.

Figure 2:
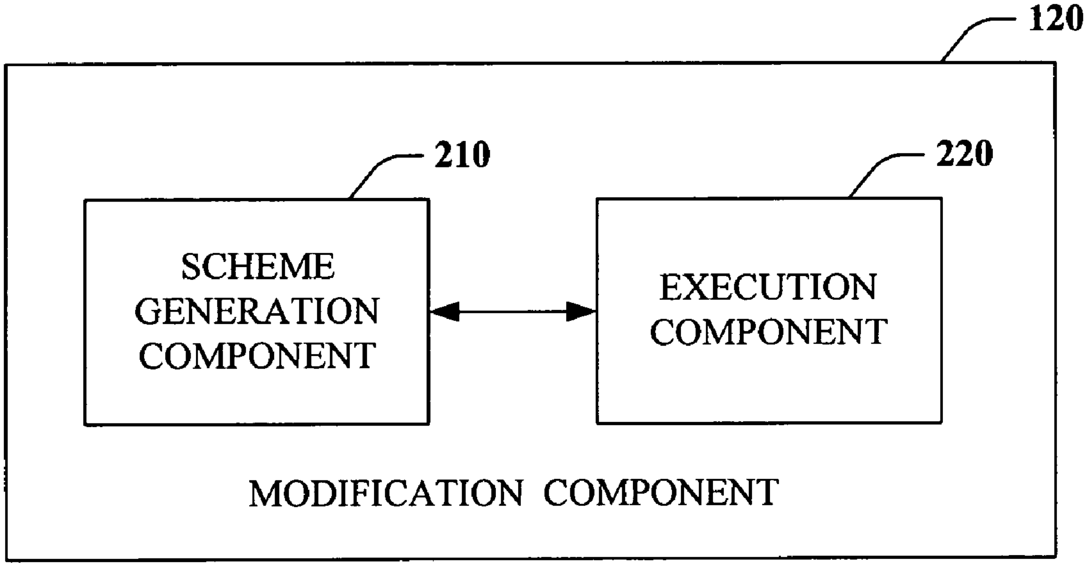
FIG. 2 is a block diagram of an exemplary modification component that can be employed with a data-structure modification system.

FIG. 2 depicts a modification component 120 that can be employed together with system 100 of FIG. 1. Modification component 120 can include a data scheme or definition generation component 210 and an execution component 220. Data scheme generation component 210 can produce or generate a data scheme or modification thereof based on the information received. For example, a generation component 210 could receive a data definition language (DDL) definition of the user defined attribute. Such information could be utilized in a larger DDL definition to define or alter a data structure scheme. For example, consider the following pseudo-DLL that could be generated by the data scheme generation component 210:

```
<Alter scope="session" UseRemoteSource="true">
  <Dimension>
      <Name>foo</Name>
      <ID>foo</ID>
      <Attributes>
                  (list again and re-define every attribute in the dimension)
                  (then, define the new Attribute that is added, with Discretization)
          <Attribute>
            <ID>foo</ID>
            <Name>foo</Name>
            <DiscretizationMethod>UserDefined</DiscretizatinoMethod>
            <Groups>
              <Group>
                (Custom Grouping Defined by User)
              </Group>
            </Groups>
          </Attribute>
      </Attributes>
    <Hierarchies>
        (Now, repeat every hierarchy that is in the dimension)
        (In one hierarchy, a level will be added to correspond to the attribute with the
    Groups)
    </Hierarchies>
  </Dimension>
    <Cube>
      <MeasureGroups>
        <MeasureGroup>
          <ID>id</ID>
          <Name>name</Name>
          <Source xsi :Type="MeasureGroupBinding">
            (MeasureGroup binding information)
          </Source>
        </MeasureGroup>
        (repeat for any other measure groups in cube)
      </MeasureGroups>
    </Cube>
  </Alter>
```

Execution component 220 can receive a data scheme or definition from the data scheme generation component 210. The execution component 220 can then execute the scheme or definition to affect the changes on a data cube. Execution of the exemplary pseudo-DLL provided above would add a custom grouping dimension attribute or level to a session cube. After the scheme is executed, the modified cube is immediately available for interaction and the newly defined groupings become visible. Furthermore, while execution component 220 has be illustrated as contained within modification component 120, it should be appreciated that it could also comprise a separate component outside modification component 120 with which modification component 120 interacts. Still further yet it should be appreciated that the interface component 110 as described in system 100 (FIG. 1) could provide a complete database scheme or definition for example in DDL. In such a case, the grouping component 120 need only receive the scheme and execute or initiate execution thereof to effectuate the modifications.

Figure 3:
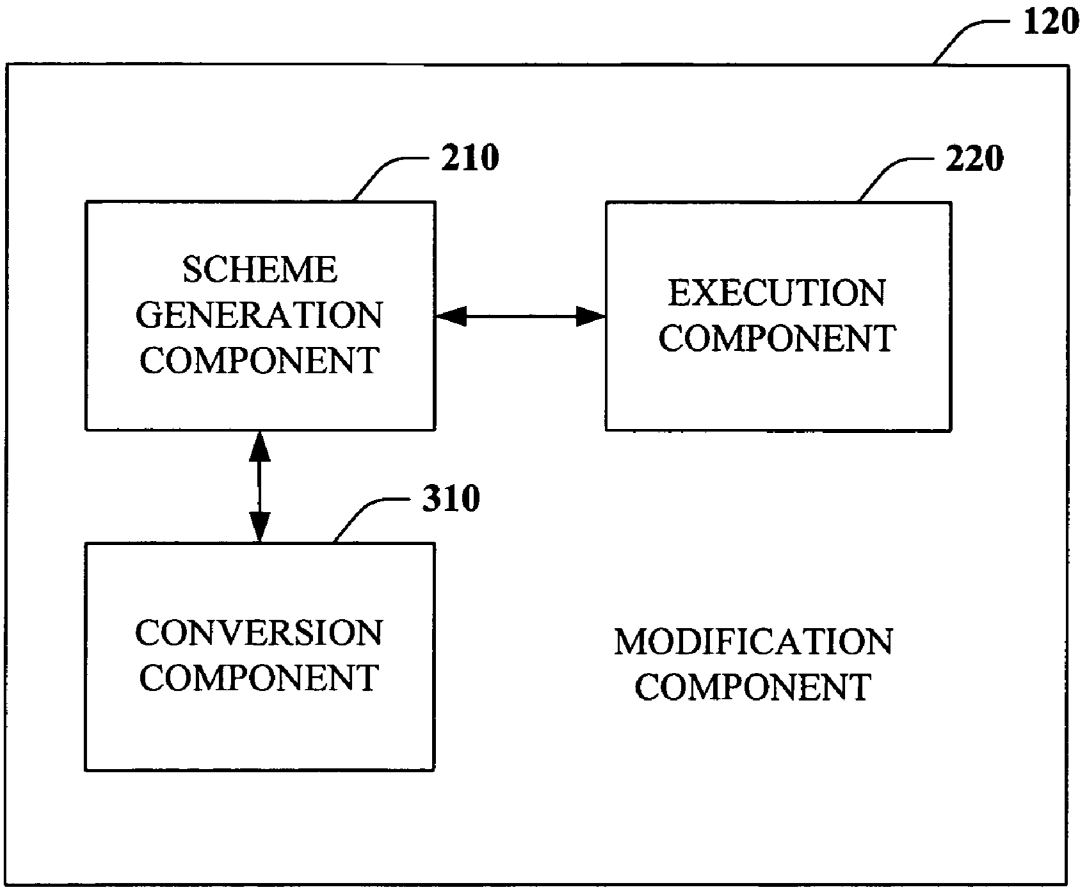
FIG. 3 is a block diagram of an exemplary modification component that can be employed with a data-structure modification system.

FIG. 3 illustrates another exemplary modification component 120. Modification component 120 can include a scheme generation component 210 and an execution component 220. As previously described with respect to FIG. 2, scheme generation component 210 can generate a data scheme or definition based at least in part on received information regarding a modification such as an added dimension attribute and/or custom groups. The execution component 220 can be communicatively coupled to the scheme generation component 210 and is operable to execute or otherwise process the scheme or definition, for example specified in a data definition language. Furthermore, modification component 120 can include or otherwise be communicatively coupled to a conversion component 310 that interacts with the scheme generation component 210 or like component. In some instances, information regarding changes to a data structure may be provided in an unfamiliar format to the scheme generation component 210. For example, the data scheme may be defined in terms of a XML-DLL. If a new dimension or group is defined in such terms, it will be easy to generate a scheme. However, if the information is provided in another syntactically and/or semantically different format then scheme generation component 210 may need some assistance. Conversion component 310 can translate or convert provided information to a format comprehended by the scheme generation component. For example, the data regarding addition of a new custom grouping attribute may be described and provided to the grouping component in a command language, which can be converted by the conversion component 310 to XML-DLL, for example, and transmitted to the generation component 210.

Figure 4:
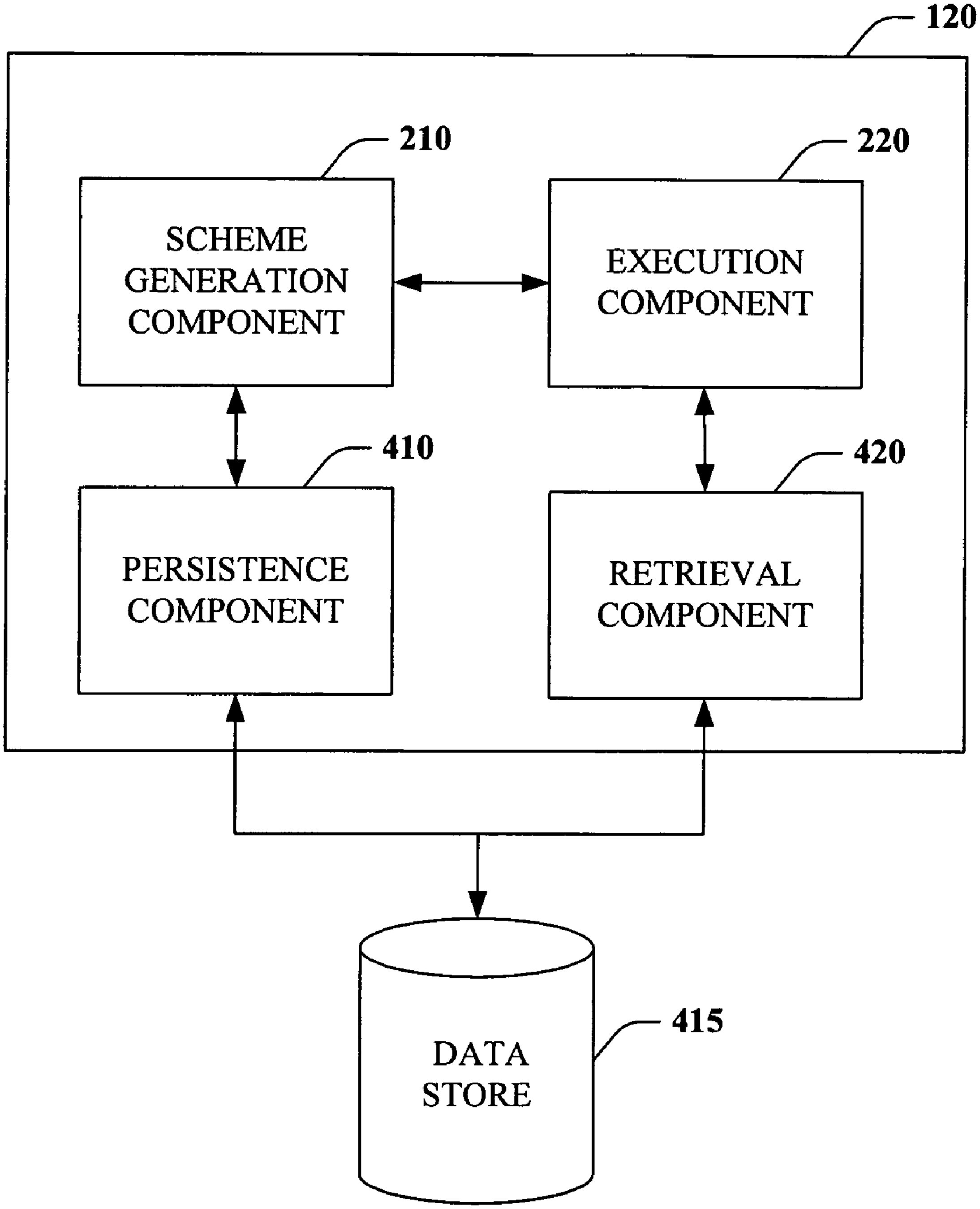
FIG. 4 is a block diagram of an exemplary modification component that can be employed in conjunction with a data-structure modification system.

FIG. 4 depicts another exemplary modification component 120. Modification component 120 can include a scheme generation component 210 and an execution component 220. Scheme generation component 210 can generate or produce a data scheme or definition based at least in part on received information regarding a modification such as an added dimension attribute and custom groups. The execution component 220 can be communicatively coupled to the scheme generation component and is operable to execute or otherwise process the scheme or definition. Modification component 120 can also include or otherwise be communicatively coupled to persistence component 410. Persistence component 410 can receive, retrieve or obtain a data scheme or definition from the scheme generation component 210 and save or persist the scheme to a data store such as data store 415. In this manner, a scheme defined by one user could be shared with other users. For example, rather than regenerating a data scheme, the provided information could identify a previously defined and saved scheme to be employed. In such an instance, grouping component 120 could employ retrieval component 420 to obtain the scheme or data definition from data store 415 and provide it to execution component 220 to generate a cube from the definition.

Figure 5:
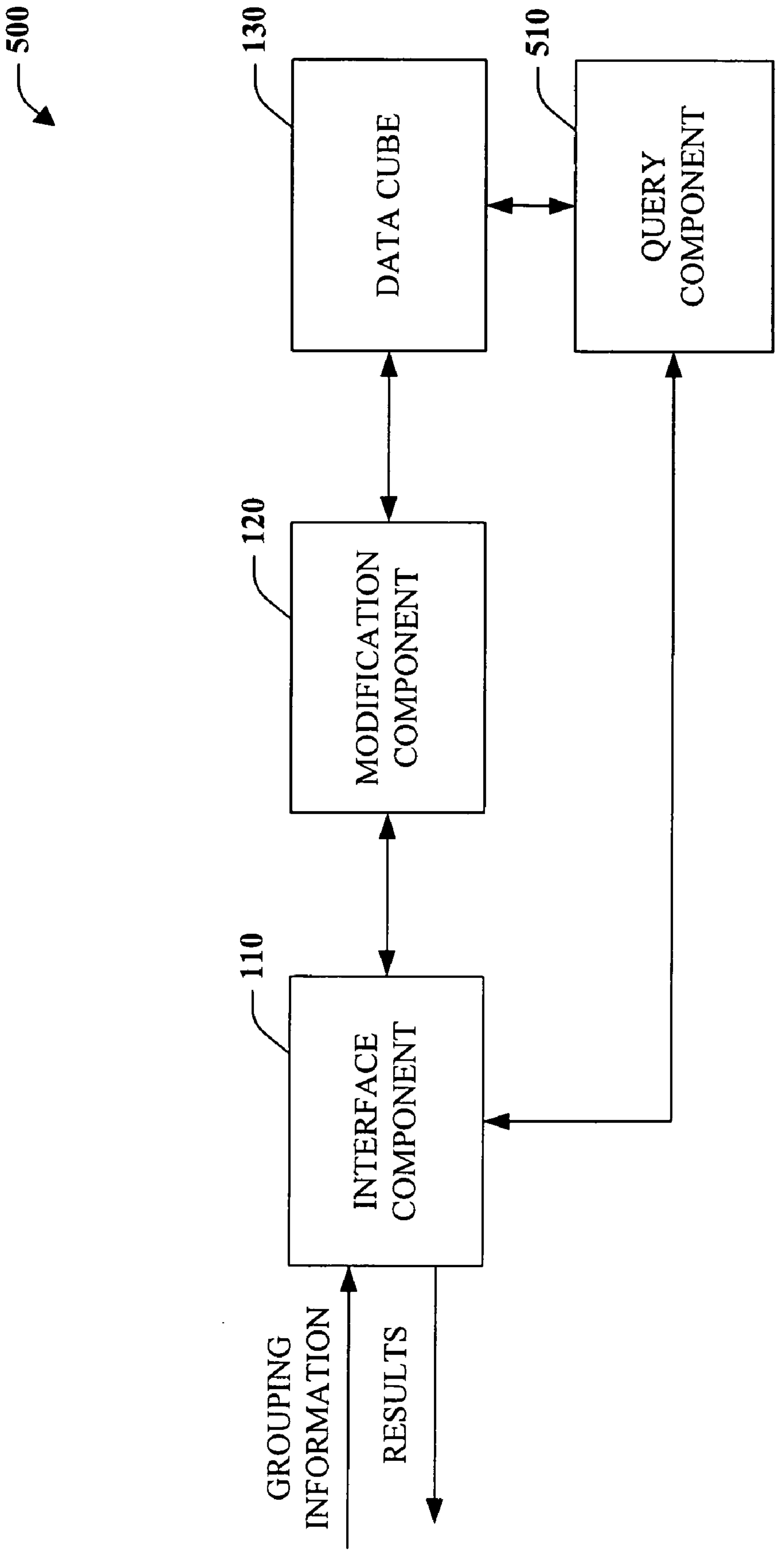
FIG. 5 is a block diagram of a data interaction system including a query component.

FIG. 5 illustrates a data interaction system 500 in accordance with an aspect of the claimed subject matter. Data interaction system 500 can include an interface component 110, a modification component 120, a data cube 130 and a query component 510. Interface component 110 can receive or otherwise obtain and transmit information to and from a user or client application associated therewith. Modification component 110 can receive information regarding modification of a data structure. For example, the modification component 110 can receive a custom grouping that defines a new user dimension attribute or level. The grouping component 110 can then process this information and modify a data structure such as data cube 130. Data cube 130 corresponds to a multidimensional database cube. Such a cube 130 can include but is not limited to a session, virtual, or local cube. Query component 510 is coupled to the interface component 110 and the data cube 130. Query component 510 can receive data queries from the interface component 110 and execute, process, or otherwise evaluate those queries with respect to the data cube 130. The query component 510 can then provide the query results back to a user or application via interface component 110. It should be noted that an update or modification of the cube structure can be accomplished through modification component 120, and subsequently, the altered structure is immediately or substantially immediately available for querying via query component 410.

For purpose of clarity and understanding and not limitation, consider an example where interface component 110 corresponds to a pivot table service that executes queries on data cube 130 to populate the pivot table and display such data for analysis. Further, assume that the data cube has a location dimension that includes attributes or levels country, state, and city and a user desires to view data via the pivot table by region such as east coast, west coast, mid-west, and the like. One way to make such a new dimension level available would be to rebuild the cube to support such levels. For example, underlying tables could be amended to include a region attribute. Subsequently, the cube and dimension could be rebuilt and reprocessed. This can take a substantial amount of time, as large quantity of data would need to be read and loaded. After an exorbitant amount of time passes, the global persisted database cube would include the new dimension and any local, session or virtual cubes derived there from could process queries against the new dimension attribute. However, this is inefficient and impractical. Users and user applications want to see the data defined by the new dimension attribute substantially simultaneously or in real-time with the request to add the attribute. Therefore, rather than rebuilding a global persisted cube a local, session, temporary or virtual cube, among other types, can be modified to include the new attribute by grouping component 120. Cube queries can then be evaluated by query component 510 almost immediately after specification of the new attribute. Accordingly, the pivot table view would be updated very quickly and include data grouped in accordance with the user defined custom grouping specified as a new dimension attribute.

Figure 6:
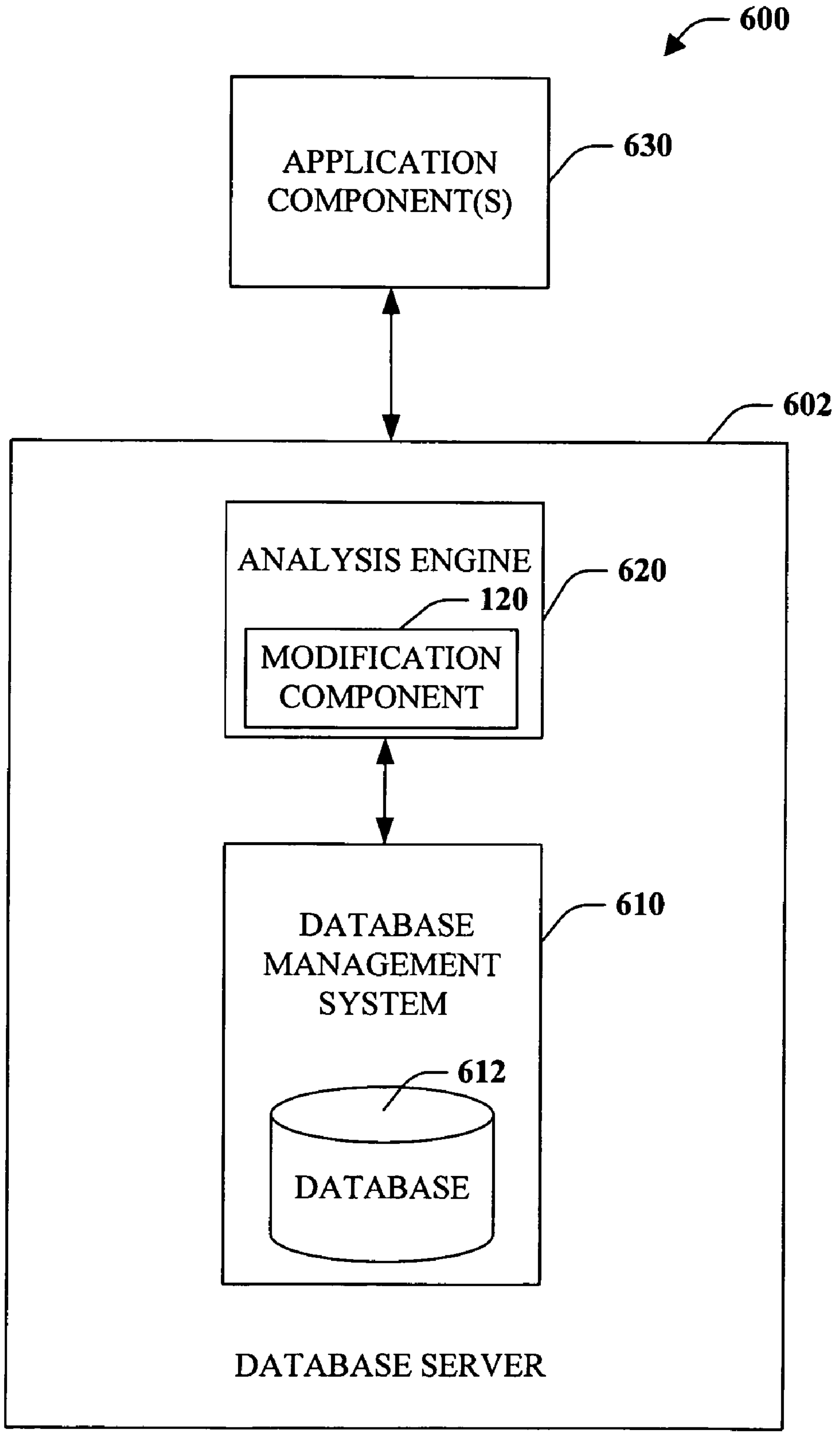
FIG. 6 is a schematic block diagram of a sample environment in which one or more disclosed components could be employed and/or incorporated.

FIG. 6 is a schematic block diagram of a sample data warehouse environment 600 in which one or more disclosed components could be employed and/or incorporated. Environment 600 can include a database management system (DBMS) 610, an analysis engine 620, and one or more application components 530. DBMS 610 can include at least one database 612 that acts as a repository for data from one or more data sources. Analysis engine 620 can specify and retrieve data from the DBMS 610 to facilitate data analysis, reporting, and data mining, among other things. Furthermore, the analysis engine 620 can perform complex operations on the retrieved or received data. Analysis engine 620 could also include a modification component 120 to enable alteration of data cube as described supra. The analysis engine 620 can also perform mapping between a multidimensional model and the database schema. The analysis engine 620 can reside on the same computer platform as the DBMS 610, be integrated into the DBMS 610, operate on a middle-tier server in a three-tier architecture, or some combination thereof. Application components 630 can include any number of software programs including instructions transforming a computer into a special purpose machine and/or tools for interacting with stored data. For example, application components 630 can include but are not limited to tools for performing data analysis, querying, reporting, and data mining. Application components 630 can request and receive/retrieve data by transmitting queries to the analysis engine 620. These queries can be multidimensional such as those specified by MDX (MultiDimensional eXpresions) and/or relational queries such as those specified in the SQL (Structured Query Language). If the query is a multidimensional query, than the analysis engine 620 can transform the query into one or more relational query statements, retrieve data from the database, format the retrieved data into a multidimensional format, and return the data to the requesting application component 630.

Figure 7:
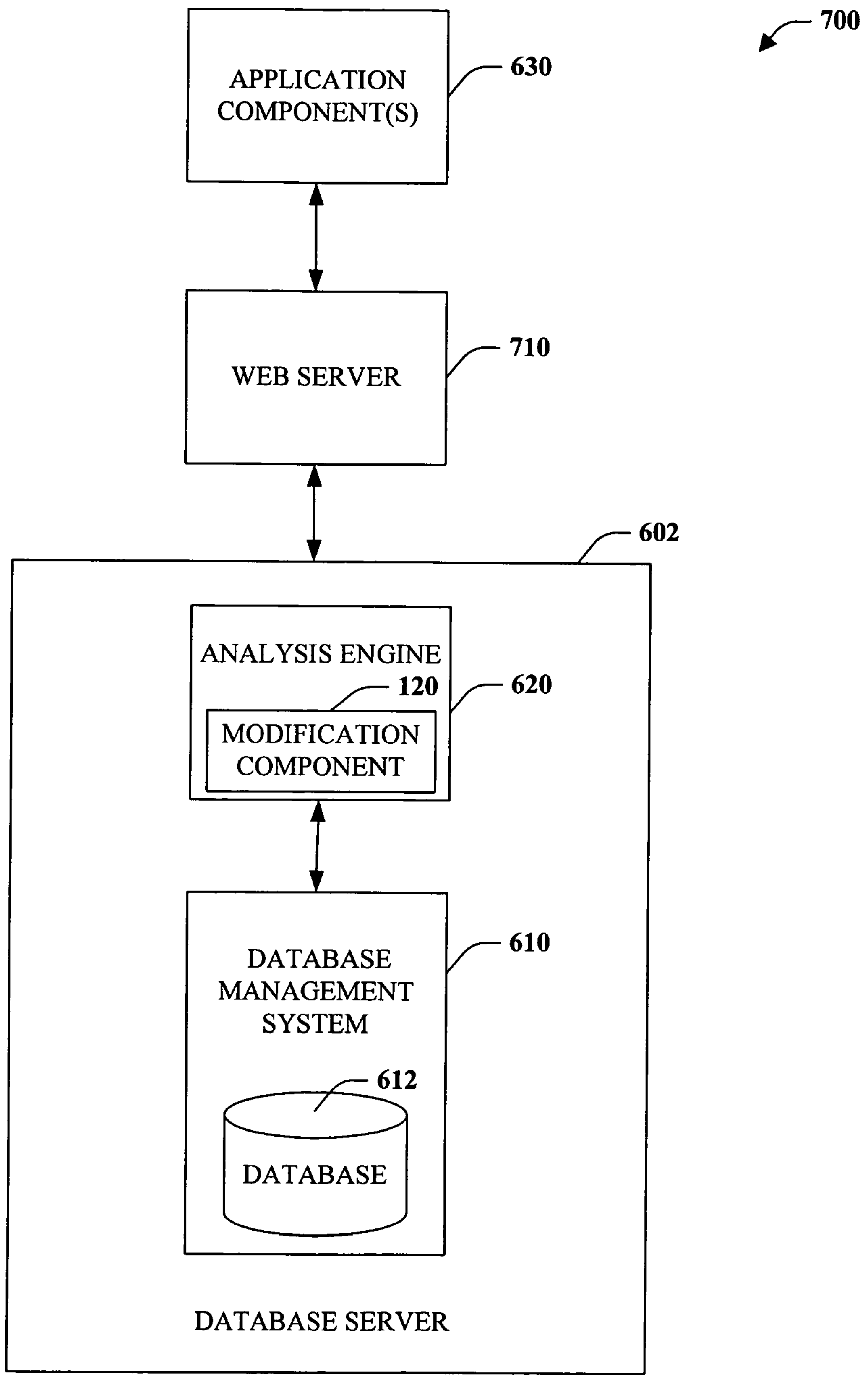
FIG. 7 is a schematic block diagram of a sample environment in which one or more disclosed components could be employed and/or incorporated.

FIG. 7 is a schematic block diagram of a sample database or data warehouse environment 700 in which one or more disclosed components could be employed and/or incorporated. Environment 700 is similar to that of environment 600 of FIG. 6 in that it includes a database server 602 including a database management system (DBMS) with an associated database 612, an analysis engine 620 which can include a modification component 120 as well as application components 630. However, environment 700 also includes a web server. Accordingly, requests for data or transmission of information proceeds from an application component 630 such as a browser executable pivot table service to an intermediate web server 710. The web server 710 can then transmit such information to the database server 602. Further, any return data or other information can be provided back to the application component(s) 630 from the database server 602 through the web server 710.

The aforementioned systems and have been described with respect to the interaction between several components. It should be appreciated that such systems and components can include those components or sub-components specified therein, some of the specified components or sub-components, and/or additional components. For example, modification component 120 can include scheme generation component 21, execution component 220, conversion component 310, persistence component 410, retrieval component 420 or any combination thereof. Some of components specified as sub-components could also be implemented as components communicatively coupled to other components. For example, modification component 120 can include a persistence component 410 or alternatively interact and communicate with a persistence component 410 external to the modification component 120. Additionally, it should be noted that one or more components may be combined into a single component providing aggregate functionality or divided into several sub-components. The components may also interact with one or more other components not specifically described herein but known by those of skill in the art.

Furthermore, as will be appreciated that various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. For example, modification component 120 could utilize artificial intelligence or like mechanisms to facilitate generation of a data scheme or data definition base on received information.

In view of the exemplary systems described supra, methodologies that may be implemented in accordance with the disclosed subject matter will be better appreciated with reference to the flow charts of FIGS. 8-12. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Figure 8:
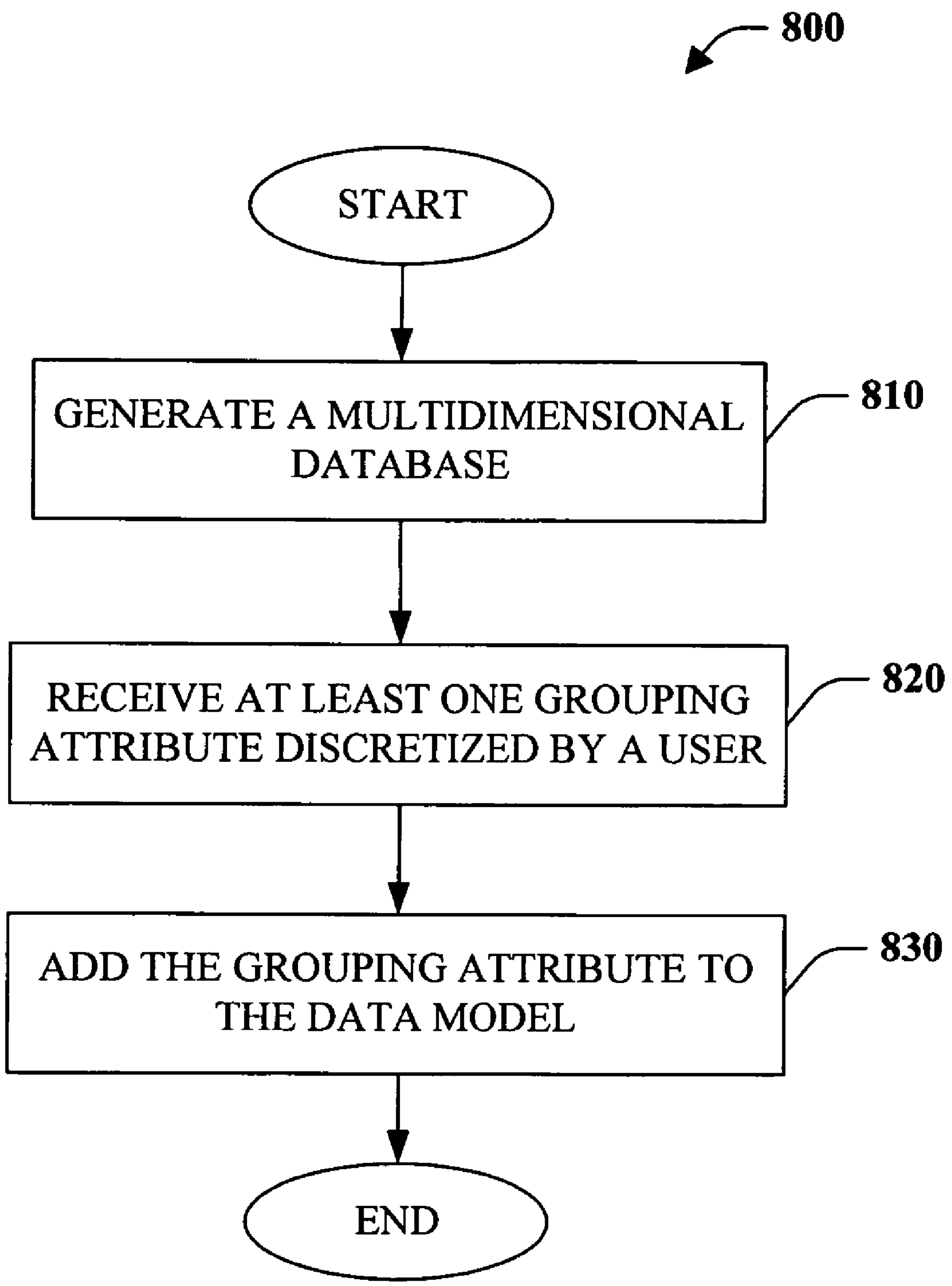
FIG. 8 is a flow chart diagram of a multidimensional database modeling methodology.

Turning to FIG. 8, a multidimensional database modeling methodology 800 illustrated. At 810, a multidimensional database is generated. For example, the database can be based on ROLAP technology. Accordingly, a plurality of relational tables can be generated that will be employed to produce a multidimensional view of data. The multidimensional model can then be generated on top of the produced tables such that dimensions map to particular tables and attributes or levels correspond to columns or rows of those a specific dimension tables. Subsequent to the initial generation of the multidimensional database, at least one grouping attribute discretized by a user is received or created at 820. The received grouping attribute can comprise a particular grouping(s) of dimensional members. Further, the grouping attribute can provide information concerning the dimensional hierarchy such as the parent and child dimension attributes. Accordingly, the grouping attribute can be an intermediate dimension level between a level with few members and a level with numerous members. Alternatively, the grouping attribute could be the top of the dimension attribute hierarchy. At 830, the grouping attribute is added to the multidimensional database model. This can be accomplished without having to modify one or more relational database tables and rebuilding the multidimensional structure, which can take a substantial amount of time (e.g., hours, days . . . ). Rather, the grouping attribute can be added directly to a data cube. This is possible at least because the current structure of the database or dimension is not being changed. Instead, additional information is being added to the cube to enable further categorization of dimension members. In essence, the new grouping provides an additional mapping of dimension members. Methodology 800 provides an alternative and more efficient method of modeling dimensional data to provide a multidimensional view of data or a multidimensional database.

Figure 9:
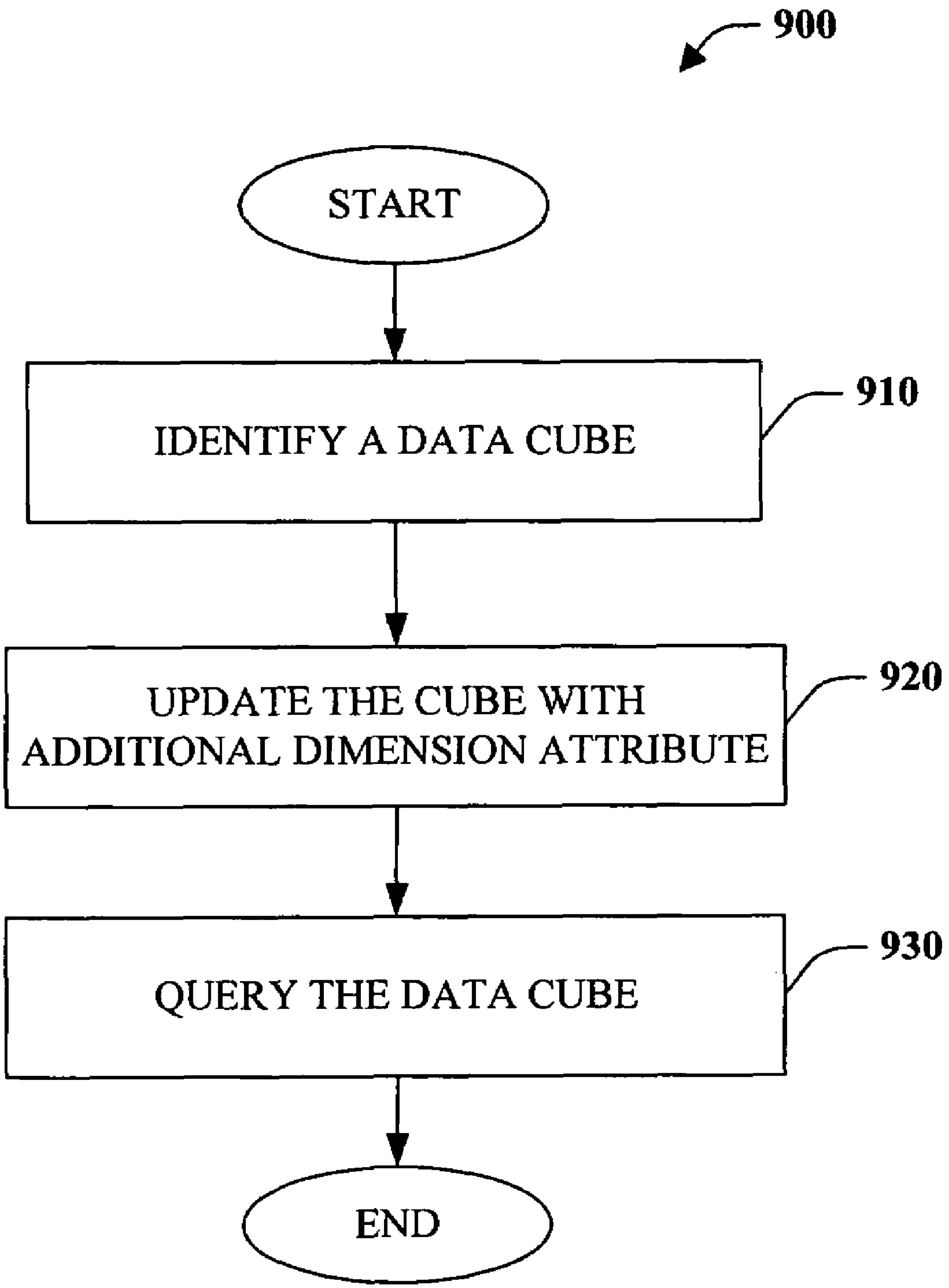
FIG. 9 is a flow chart diagram of a method of interacting with a multidimensional data cube.

FIG. 9 depicts a method 900 of interacting with a multidimensional data cube. At reference numeral 910, a data cube is identified. By way of example and not limitation, a pivot table service or application, or user thereof could identify a local or session cube that it is being employed to populate a table and/or view. At 920, the identified cube can be updated to include an additional dimension. Such a dimension could be a user defined grouping(s). Continuing the above example, a user may wish to view data by region rather than state and country. Alternatively, a user may desire to view and analyze data with respect to designated product groups that are not provided by the cube. The cube can be updated upon providing grouping information to a component such as the modification component described supra. Such information can include the members comprising each group as well as identifies or names associated therewith. Further, the provided information can include hierarchical information such as the parent and child of the new dimension attribute or level. Behind the scenes, the cube can be updated or a proxy cube created that includes and/or supports the new dimension attribute and user defined grouping(s). At 930, the updated data cube can be queried. In the on going example, a pivot table application could query the data cube to update a view with the new group. The amended cube is available for querying much faster than if the cube had to be rebuilt (e.g., alter relational tables) and processed.

Figure 10:
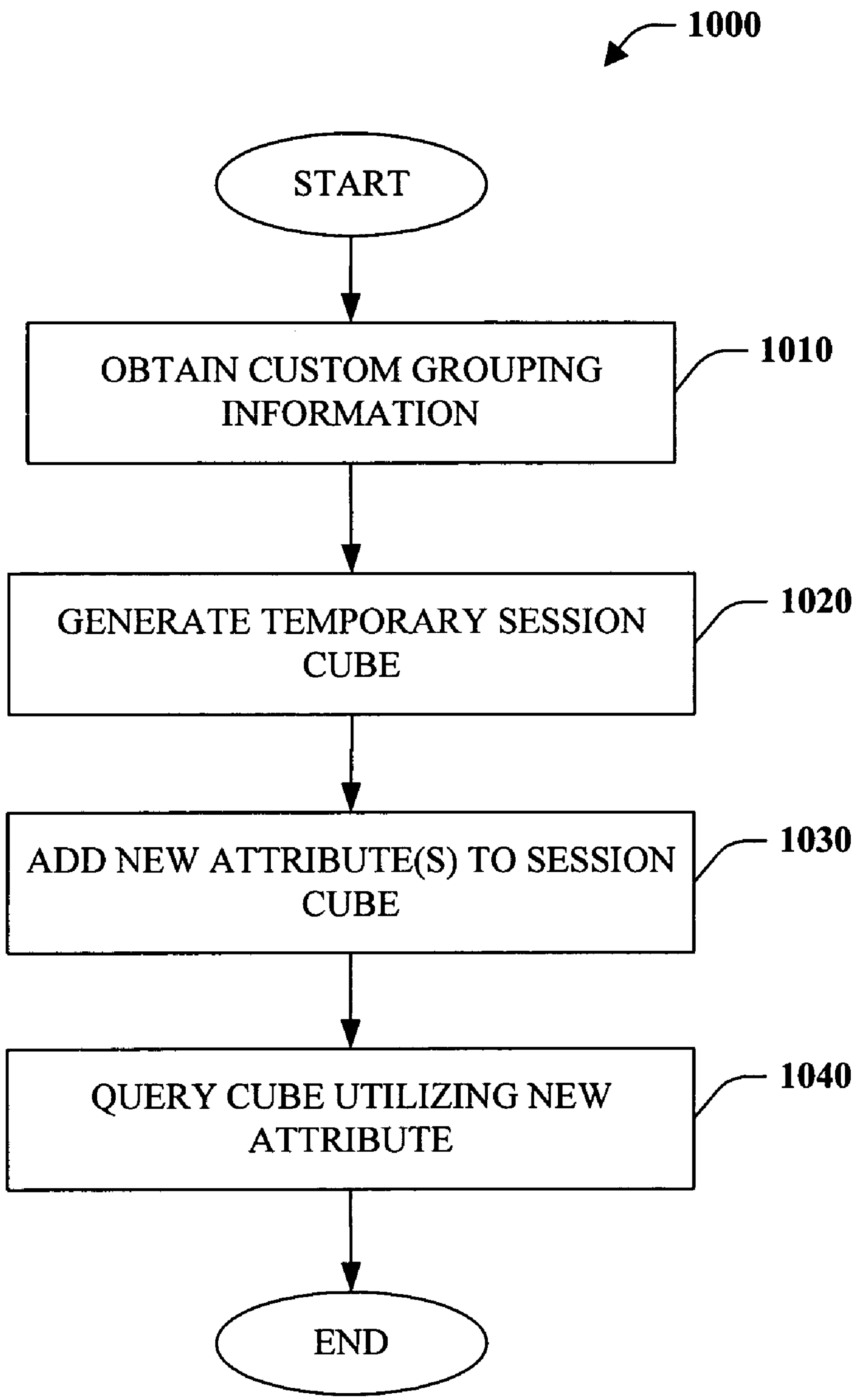
FIG. 10 is a flow chart diagram illustrating a multidimensional database interaction methodology.

FIG. 10 provides a flow chart diagram illustrating a multidimensional database interaction methodology 1000. At reference numeral 1010, custom grouping information is obtained. The information can be obtained from an application such as a pivot table application or a wizard that presents a series of questions directed toward definition of one or more dimension attribute groups. The custom grouping information can include identification of one or more sets or collections of members and the relationship of the one or more collections within an attribute hierarchy. Such custom grouping can be defined or specified by a user. At 1020, a temporary session cube is generated. Such a cube can be generated from a global cube or a local cube. The global cube can be the database cube including all data. The local cube can be a cube generated and including a subset of data from the global cube. A local cube can be a cube located on a client computer to facilitate data analysis without continuous connection to a server and the global cube, although the local cube can be updated from the global cube when communicatively connected. The temporary session cube can be destroyed upon closure of a session. At reference 1030, one or more new attributes are added to the session cube. This new attribute(s) corresponds to one or more of the defined groupings for which information was obtained. It should be appreciated that generation of the temporary session cube and addition of a new attribute to the session cube can occur simultaneously or with the same act or set of actions. At 1040, the cube is queried utilizing the newly added attribute(s). Furthermore, rather than destroying the cube upon closure, it should be noted that the cube could be persisted or saved to enable other users to employ, view, or navigate the same cube with the newly added attribute(s).

Figure 11:
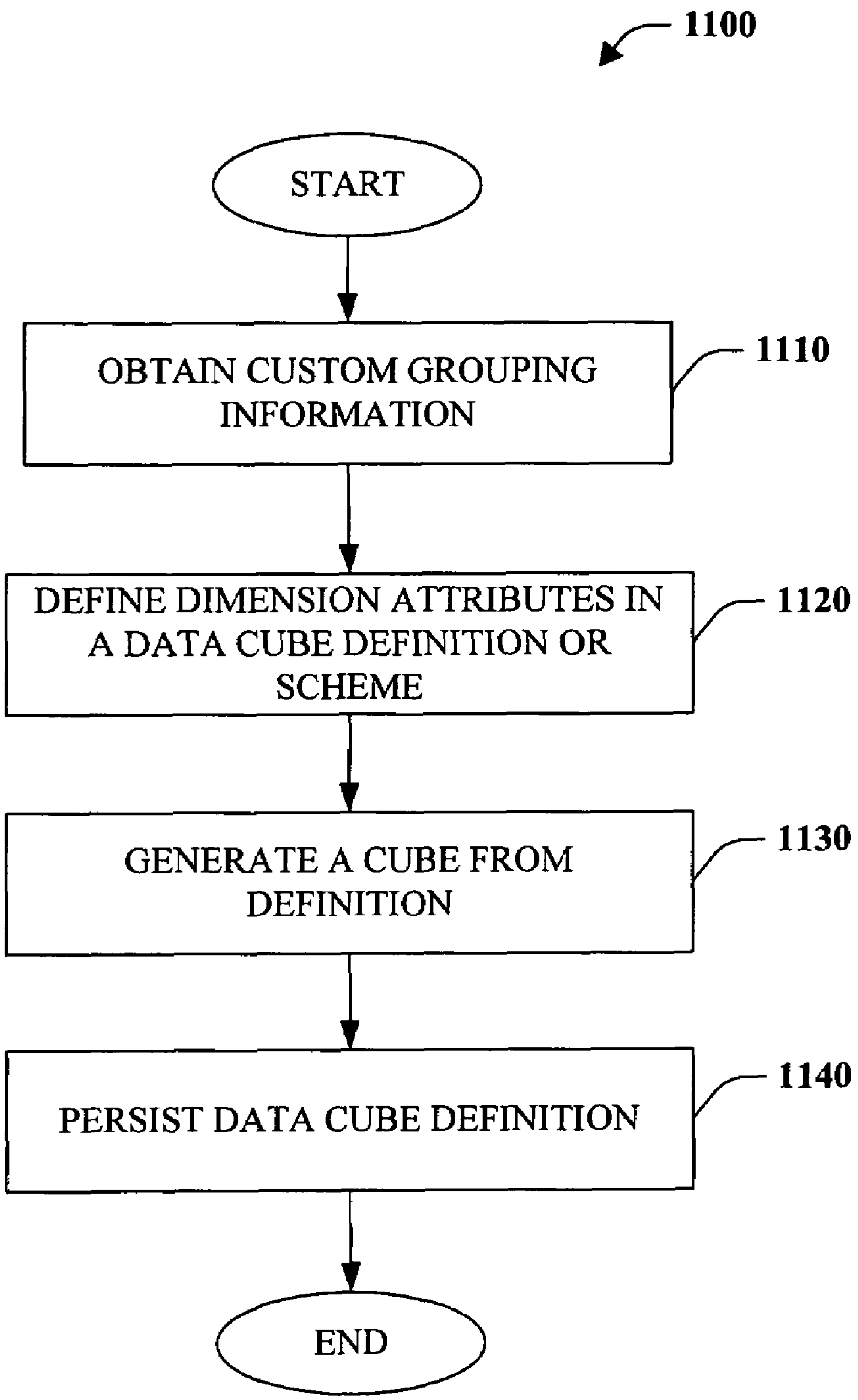
FIG. 11 is a flow chart diagram depicting a multidimensional data cube interaction methodology.

Turning to FIG. 11, a multidimensional data cube interaction methodology 1100 is depicted. At reference numeral 1110, custom grouping information defined by a user, for example, is obtained. At 1120, one or more dimension attributes are defined in a data cube scheme or definition. For example, a data definition language (DDL) or more specifically a XML-DLL can be utilized to define or alter a cube such that it includes, among other things, one or more custom member groupings. At 1130, a cube can be generated from the generated scheme or definition. For example, a session cube could be created. Upon creation, such a cube could be utilized to supply data to querying entities or applications. At reference numeral 1140, the data cube definition 1140 can be persisted to a nonvolatile data store including but not limited to a database or file. This enables a cube with added attributes to be generated again in another session and/or by another user or application.

Figure 12:
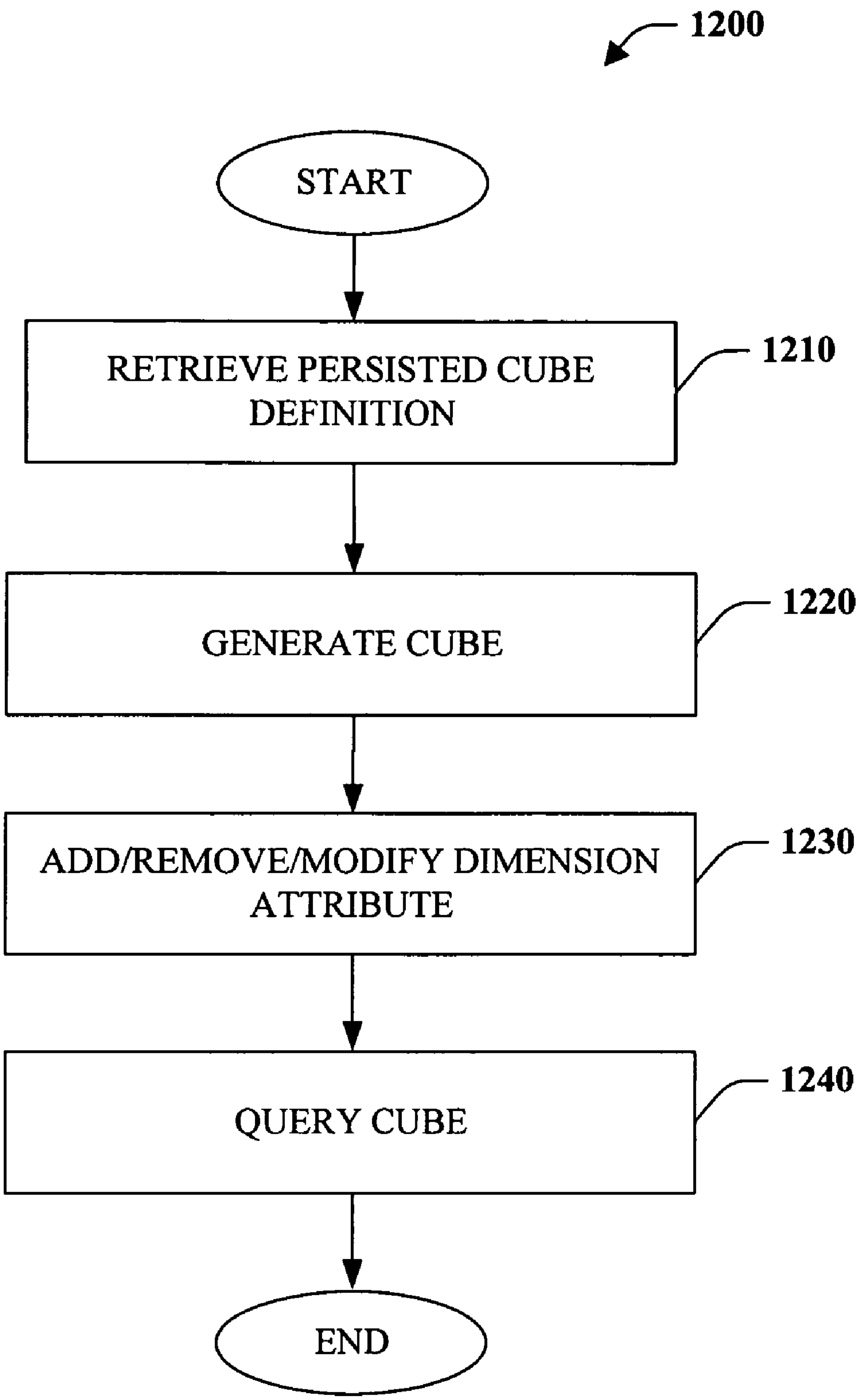
FIG. 12 is a flow chart diagram illustrating a multidimensional data cube interaction methodology.

FIG. 12 is a flow chart diagram depicting a multidimensional data cube interaction methodology 1200. At reference numeral 1210, a persisted cube definition or scheme is retrieved, received or otherwise obtained. In one instance, the cube can be defined via DDL, XML-DDL, or other data definition languages or schemes. The cube definition or scheme can be retrieved from some remote or local data storage device, system or component. At 1220, a cube is generated from the retrieved cube definition. At 1230, a dimension attribute is either added, removed or modified. For example, a new dimension attribute can be added to correspond to a grouping of members desired by a user. Additionally or alternatively, a dimension attribute could be removed from the cube such as but not limited to a previously added attribute grouping. Still further yet, a dimension attribute could be modified to support "what if" analysis, for instance. In such a case, attribute groupings could be modified to include or remove members. Modification of the cube structure can be accomplished by specifying a new cube providing the new state or alternatively a specific cube such as a session or virtual cube could be altered. In either case, the new cube could be defined, or the amendments specified, utilizing a data definition language that can subsequently be executed or process to achieve the desired results. At 1240, the cube can be queried. Accordingly, queries can be processed against the current state of the cube. It should be appreciated that the subject methodology can be employed to easily manipulate a cube structure to facilitate data analysis. Accordingly, a user or client application alone and/or a database administrator can quickly manipulate a cube such that it can be analyzed employing particular dimension attributes that a main global cube may not contain.

Figure 13:
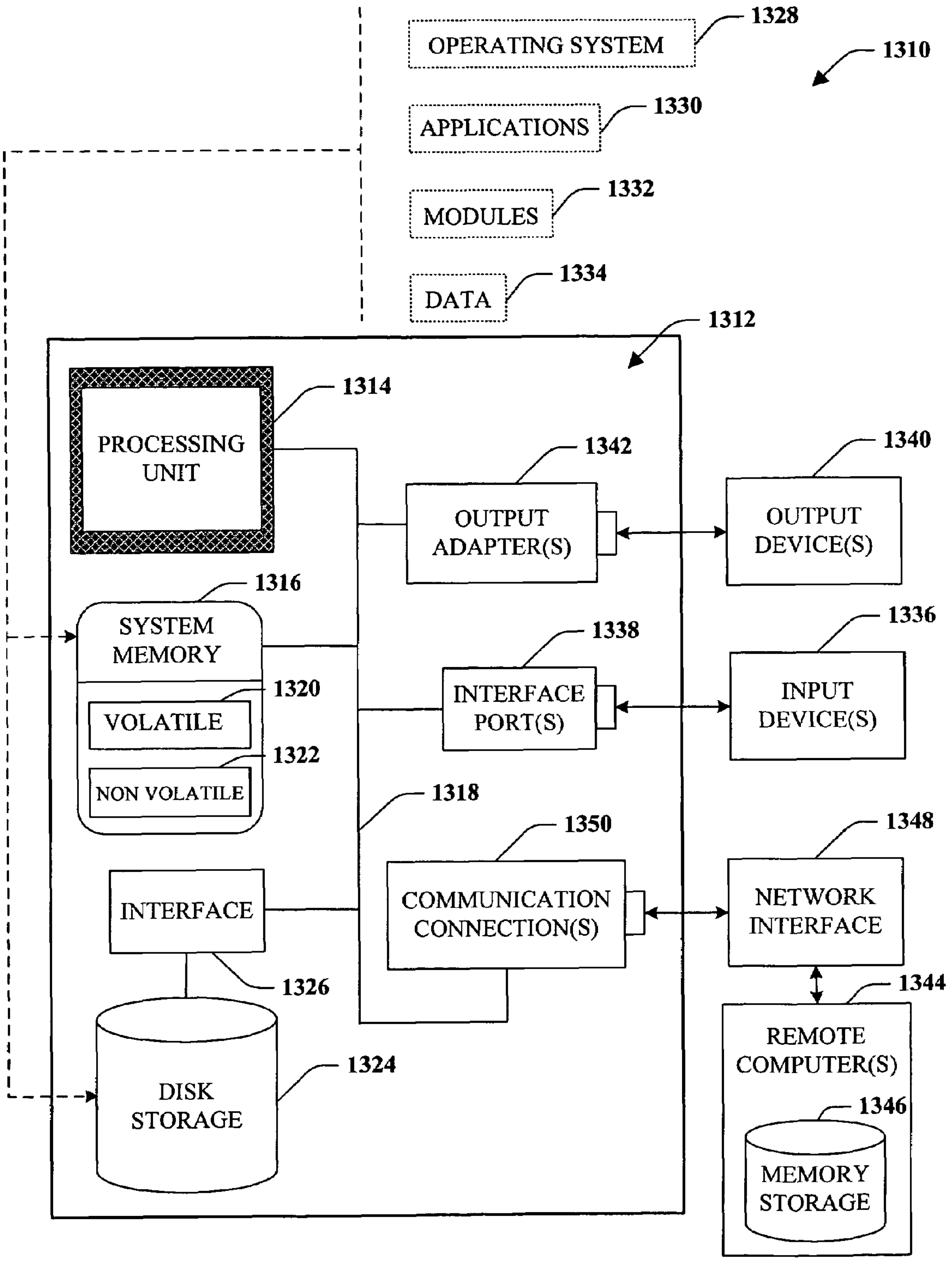
FIG. 13 is a schematic block diagram illustrating a suitable operating environment.
Figure 14:
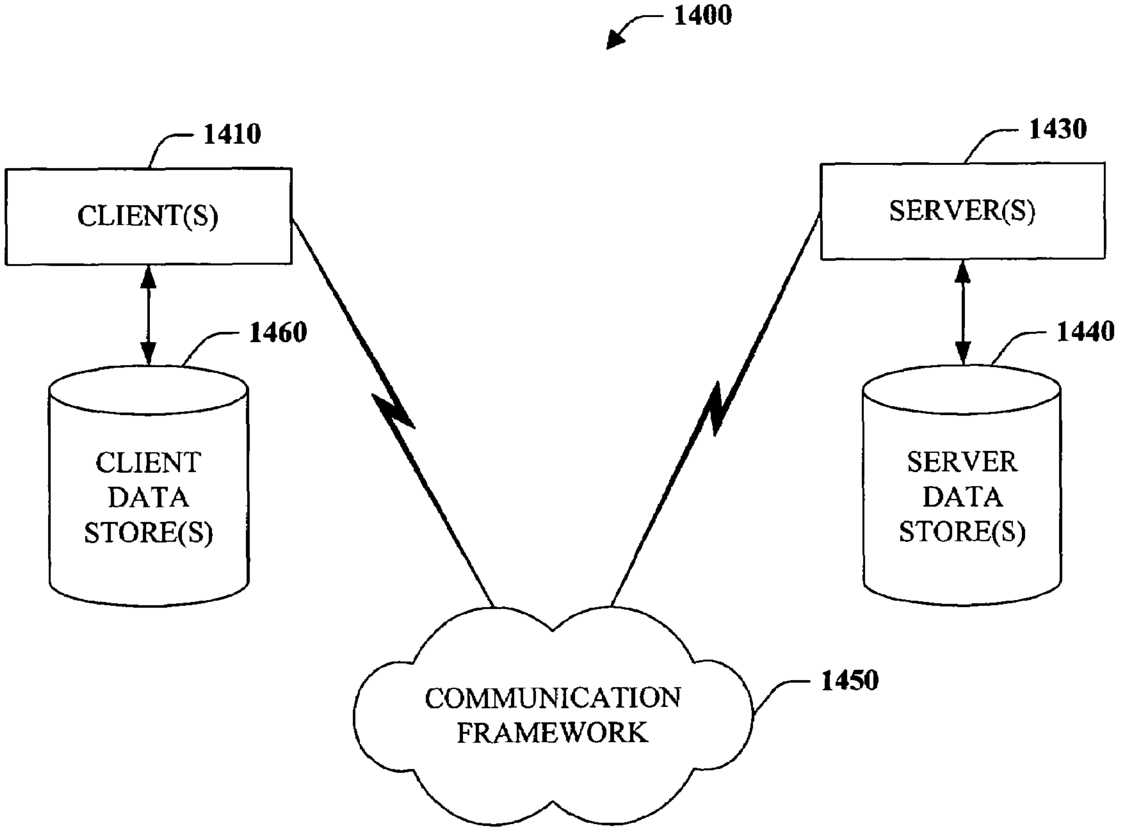
FIG. 14 is a schematic block diagram of a sample-computing environment.

In order to provide a context for the various aspects of the disclosed subject matter, FIGS. 13 and 14 as well as the following discussion are intended to provide a brief, general description of a suitable environment in which the various aspects of the present invention may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 13, an exemplary environment 1310 for implementing various aspects disclosed herein includes a computer 1312 (e.g., desktop, laptop, server, hand held, programmable consumer or industrial electronics . . . ). The computer 1312 includes a processing unit 1314, a system memory 1316, and a system bus 1318. The system bus 1318 couples system components including, but not limited to, the system memory 1316 to the processing unit 1314. The processing unit 1314 can be any of various available microprocessors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable ROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/non-removable, volatile/non-volatile computer storage media. FIG. 13 illustrates, for example, disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in suitable operating environment 1310. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the present invention can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312 and to output information from computer 1312 to an output device 1340. Output adapter 1342 is provided to illustrate that there are some output devices 1340 like displays (e.g., flat panel and CRT), speakers, and printers, among other output devices 1340 that require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems, power modems and DSL modems, ISDN adapters, and Ethernet cards or components.

FIG. 14 is a schematic block diagram of a sample-computing environment 1400 with which the present invention can interact. The system 1400 includes one or more client(s) 1410. The client(s) 1410 can be hardware and/or software (e.g., threads, processes, computing devices). The system 1400 also includes one or more server(s) 1430. Thus, system 1400 can correspond to a two-tier client server model or a multi-tier model (e.g., client, middle tier server, data server), amongst other models. The server(s) 1430 can also be hardware and/or software (e.g., threads, processes, computing devices). The servers 1430 can house threads to perform transformations by employing the present invention, for example. One possible communication between a client 1410 and a server 1430 may be in the form of a data packet adapted to be transmitted between two or more computer processes. The system 1400 includes a communication framework 1450 that can be employed to facilitate communications between the client(s) 1410 and the server(s) 1430. The client(s) 1410 are operably connected to one or more client data store(s) 1460 that can be employed to store information local to the client(s) 1410. Similarly, the server(s) 1130 are operably connected to one or more server data store(s) 1440 that can be employed to store information local to the servers 1430.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A computer implemented data structure interaction apparatus for efficiently adding a hierarchical viewable dimension of a data cube for a qualitative dimension, the apparatus comprising:

a tangible computer readable storage medium comprising:

an online analytical processing (OLAP) data cube composed of measure groups or measures and further composed of at least three qualitative data dimensions, wherein the data cube comprises a data structure of dimension attributes mapped to columns or rows;

an input interface component that receives grouping information specified by a user;

a modification component that adds one or more user-defined dimension groupings to the data cube as an intermediate dimension level based at least in part on the received information without a rebuild of underlying structure and a reload of data by further categorization to essentially provide additional mapping of dimension members; and a display for displaying the data cube using the definition.

2. The apparatus of claim 1, the interface component is one of a pivot table application and a wizard.

3. The apparatus of claim 1, the information includes identification of one or more dimension members and a name that corresponds to the one or more members.

4. The apparatus of claim 3, the information further includes at least one of identification of a parent and child dimension attribute.

5. The apparatus of claim 1, the modification component generates a new dimension attribute on the data cube that includes the one or more dimension groupings.

6. The apparatus of claim 1, the modification component includes a scheme generation component that generates a cube scheme or data definition that includes the one or more dimension groupings.

7. The apparatus of claim 6, the modification component includes an execution component that processes the data definition to produce a modified cube.

8. The apparatus of claim 1, the modification component includes a persistence component that stores the cube scheme to a data store.

9. The apparatus of claim 1, the modification component includes a retrieval component that retrieves a cube scheme from a data store rather then producing a new scheme.

10. The apparatus of claim 1, further comprising a query component that receives one or more queries from the interface component, evaluates the query with respect to the data cube and returns results to the interface component.

11. The apparatus of claim 1, the cube is a session cube.

12. The computer implemented data structure interaction apparatus of claim 1, wherein the qualitative data dimension comprises a time dimension.

13. The computer implemented data structure interaction apparatus of claim 1, wherein the qualitative data dimension comprises a product.

14. The computer implemented data structure interaction apparatus of claim 1, wherein the measure comprises a value associated with a business transaction.

15. The computer implemented data structure interaction apparatus of claim 1, wherein the data cube further comprises a relational on-line analytical processing (ROLAP) system.

16. The computer implemented data structure interaction apparatus of claim 1, wherein the qualitative data dimension comprises a geographic location.

17. The computer implemented data structure interaction apparatus of claim 1, wherein the user defined dimension grouping supports drill down, drill up or roll up between a level with few members and a level with numerous members on the display.

18. The computer implemented data structure interaction apparatus of claim 1, wherein the user defined dimension grouping supports adding a top level attribute grouping to the data cube.

19. A computer implemented method of modeling dimensional data for efficiently adding a hierarchical viewable dimension of a data cube for a qualitative dimension, comprising:

providing an online analytical processing (OLAP) data cube composed of measure groups or measures and further composed of at least three qualitative data dimensions, wherein the data cube comprises a data structure of dimension attributes mapped to columns or rows;

creating a custom grouping attribute discretized by a user;

adding the attribute to a qualitative multidimensional data model dimension for utilizing the data cube without reprocessing or rebuilding the cube from underlying tables; and displaying the data cube using the definition.

20. The method of claim 19, further comprising generating a multidimensional data model prior to creating a custom grouping attribute and adding the attribute to a model dimension.

21. The method of claim 19, adding the attribute to a model dimension includes adding the attribute to a dimension hierarchy.

22. The method of claim 19, creating a custom grouping attribute including a plurality of dimension member sets.

23. The method of claim 19, further comprising deleting the attribute to the multidimensional data model dimension of the data cube to generate a comparison.

24. A computer implemented method of interacting with a multidimensional database cube for efficiently adding a viewable hierarchical dimension of a data cube for a qualitative dimension, the method comprising:

a tangible computer readable storage medium having stored thereon computer executable instructions for performing the following acts:

providing an Online Analytical Processing (OLAP) data cube composed of measure groups or measures and further composed of at least three qualitative data dimensions, wherein the data cube comprises a data structure of dimension attributes mapped to columns or rows;

obtaining dimension member grouping information defined by a user;

producing a cube definition as an intermediate dimension level that avoids rebuilding the data cube and that includes at least one new dimension attribute including one or more dimension member groups; and generating a viewable data cube from the data cube and the cube definition.

25. The method of claim 24, further comprising persisting the cube definition to a nonvolatile storage medium.

26. The method of claim 24, further comprising querying the cube.

* * * * *